(12) United States Patent
Dayan et al.

(10) Patent No.: US 7,765,587 B2
(45) Date of Patent: Jul. 27, 2010

(54) GLYPHWORD-BASED SECURITY

(75) Inventors: Richard A. Dayan, Wake Forest, NC (US); Jeffrey B. Jennings, Raleigh, NC (US); Kofi Kekessie, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/464,330

(22) Filed: Aug. 14, 2006

(65) Prior Publication Data

US 2008/0040612 A1 Feb. 14, 2008

(51) Int. Cl.
*H04L 29/00* (2006.01)
(52) U.S. Cl. .................. 726/7; 713/183; 713/202; 380/23
(58) Field of Classification Search .......... 713/183, 713/202; 380/23; 726/7
See application file for complete search history.

(56) References Cited

U.S. PATENT DOCUMENTS

| 4,610,025 A | 9/1986 | Blum et al. |
| 5,428,349 A * | 6/1995 | Baker ................. 340/5.54 |
| 6,223,289 B1 | 4/2001 | Wall et al. |
| 6,552,727 B2 | 4/2003 | Stamm |
| 2004/0250138 A1 * | 12/2004 | Schneider ............ 713/202 |

* cited by examiner

*Primary Examiner*—Carl Colin
*Assistant Examiner*—Anthony Brown
(74) *Attorney, Agent, or Firm*—Brandon C. Kennedy; Cynthia G. Seal; Biggers & Ohanian, LLP.

(57) ABSTRACT

Methods, systems, and computer program products are provided for glyphword-based security. Embodiments include establishing a glyphword comprising a plurality of glyphs; and creating a plurality of glyphsheets wherein each glyphsheet includes one or more glyphs included in the established glyphword and one or more glyphs not included in the established glyphword; and for each glyphsheet: presenting to a user the glyphsheet; receiving from the user at least one selection of a glyph included in the glyphsheet; determining whether the glyphsheet is the last glyphsheet if the glyph selected by the user is not included in the glyphs of the glyphword; and providing access to a resource if the glyphsheet is the last glyphsheet.

17 Claims, 5 Drawing Sheets

GLYPHWORD-BASED SECURITY

BACKGROUND OF THE INVENTION

1. Field of the Invention

The field of the invention is data processing, or, more specifically, methods, systems, and products for glyphword-based security.

2. Description of Related Art

There are many forms of security systems providing authentication and authorization to grant or deny access to resources. Such conventional security systems often include a challenge and response, implemented for example, by prompting a user for a password and a user entering their password. Passwords may be implemented as a collection of characters, symbols or pictures. If the correct password is received in response to a challenge in such systems, then the user is granted access to the resource. The problem with such challenge response based systems is that they are subject to someone viewing or video recording the characters, symbols, or pictures of the password as a user enters the response to the challenge. There is therefore an ongoing need for improvement in security systems.

SUMMARY OF THE INVENTION

Methods, systems, and computer program products are provided for glyphword-based security. Embodiments include establishing a glyphword comprising a plurality of glyphs; and creating a plurality of glyphsheets wherein each glyphsheet includes one or more glyphs included in the established glyphword and one or more glyphs not included in the established glyphword; and for each glyphsheet: presenting to a user the glyphsheet; receiving from the user at least one selection of a glyph included in the glyphsheet; determining whether the glyphsheet is the last glyphsheet if the glyph selected by the user is not included in the glyphs of the glyphword; and providing access to a resource if the glyphsheet is the last glyphsheet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
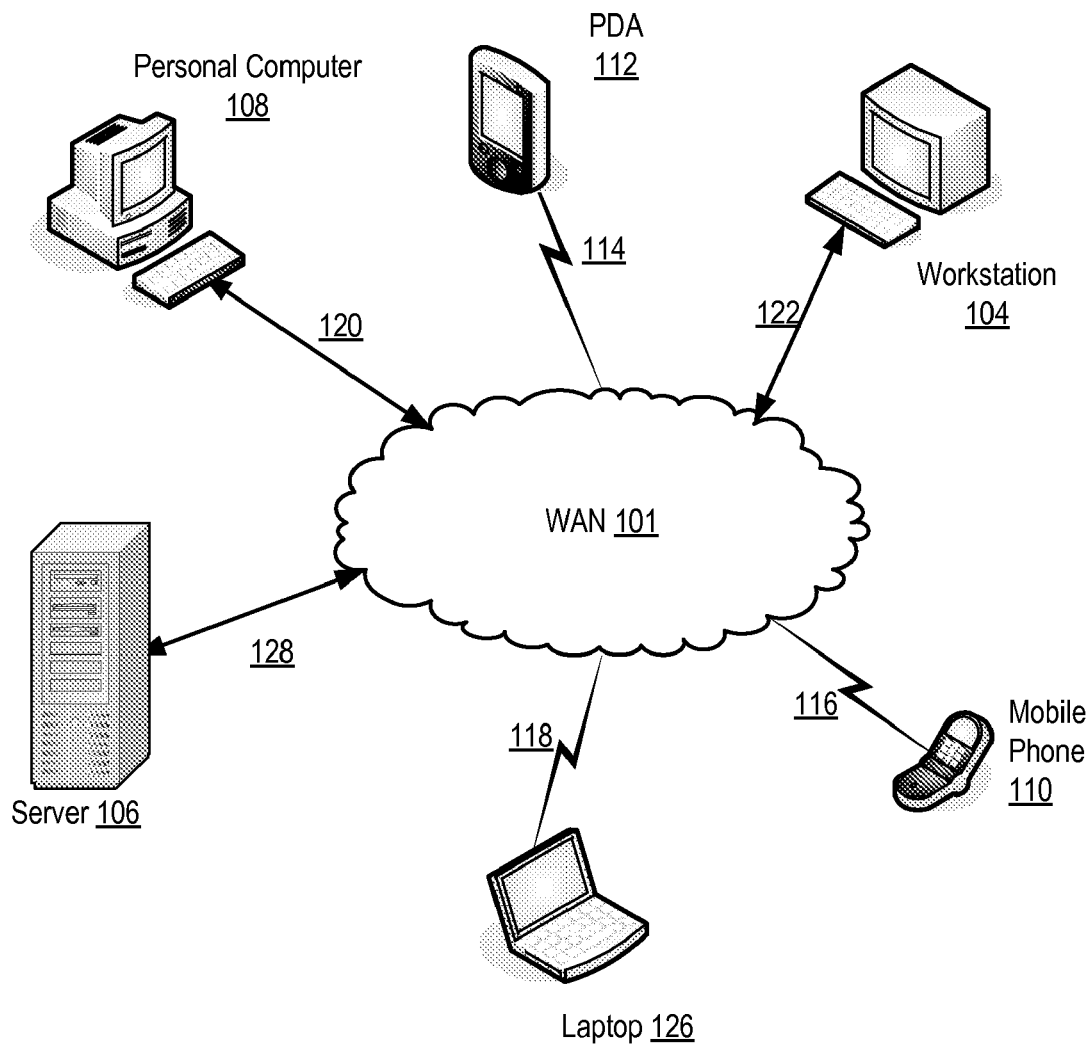
FIG. 1 sets forth a network diagram illustrating an exemplary system useful for glyphword-based security according to embodiments of the present invention.

Exemplary methods, systems, and products for glyphword-based security according to embodiments of the present invention are described with reference to the accompanying drawings, beginning with FIG. 1. FIG. 1 sets forth a network diagram illustrating an exemplary system useful for glyphword-based security according to embodiments of the present invention. The system of FIG. 1 includes a number of computer devices coupled for data communications with a wide area network ('WAN') (101). The example of FIG. 1 includes a server (106) coupled for data communications to the WAN (101) through a wireline connection (128). The example of FIG. 1 also includes a personal computer (108) coupled for data communications to the WAN (101) through a wireline connection (120). The example of FIG. 1 also includes a personal digital assistant ('PDA') (112) coupled for data communications to the WAN (101) through a wireless connection (114). The example of FIG. 1 also includes a workstation (104) coupled for data communications to the WAN (101) through a wireline connection (122). The example of FIG. 1 also includes a mobile phone (110) coupled for data communications to the WAN (101) through a wireless connection (116). The example of FIG. 1 also includes a laptop (126) coupled for data communications to the WAN (101) through a wireless connection (118).

Each of the devices (106, 108, 112, 104, 110, 126, and 128) are capable of supporting a glyph-based security module, computer program instructions capable of establishing a glyphword comprising a plurality of glyphs; creating a plurality of glyphsheets wherein each glyphsheet includes one or more glyphs included in the established glyphword and one or more glyphs not included in the established glyphword; and for each glyphsheet: presenting to a user the glyphsheet; receiving from the user at least one selection of a glyph on the glyphsheet; determining whether the glyphsheet is the last glyphsheet if the glyph selected by the user is not included in the glyphs of the glyphword; and providing access to a resource if the glyphsheet is the last glyphsheet. Glyphword-based security modules according to the present invention may be used to provide security for resources such as computers, individual files or resources stored on computers, networks, or any other resources as will occur to those of skill in the art.

A glyph is a symbolic figure or character that stands for an element in a glyphword. A glyphword is a collection of glyphs defining a password for a user, a process, or a resource. A glyphsheet is a collection of glyphs, often implemented as a matrix of glyphs. Glyphsheets typically include one or more glyphs included in the established glyphword and one or more glyphs not included in the established glyphword. To gain access to a resource a user is required to select glyphs from each presented glyphsheet that are not included in the glyphword governing access to the resource. Requiring a user to select glyphs not included in the glyphword advantageously makes it difficult for would-be intruders to determine the glyphword by monitoring the user's logging into through glyphsheets.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Glyphword-based security in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in glyphword-based security according to embodiments of the present invention. The computer (152) of FIG. 2 includes at least one computer processor (156) or 'CPU' as well as random access memory (168) ('RAM') which is connected through a system bus (160) to processor (156) and to other components of the computer.

Stored in RAM (168) is a glyphword-based security module (210) capable of glyphword-based security according to the present invention. The glyphword-based security module (210) comprises computer program instructions for establishing a glyphword comprising a plurality of glyphs; creating a plurality of glyphsheets wherein each glyphsheet includes one or more glyphs included in the established glyphword and one or more glyphs not included in the established glyphword; and for each glyphsheet: presenting to a user the glyphsheet; receiving from the user at least one selection of a glyph on the glyphsheet; determining whether the glyphsheet is the last glyphsheet if the glyph selected by the user is not included in the glyphs of the glyphword; and providing access to a resource if the glyphsheet is the last glyphsheet.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and glyphword-based security module (210) in the example of FIG. 2 are shown in RAM (168), but many components of such software typically are stored in non-volatile memory (166) also.

Figure 2:
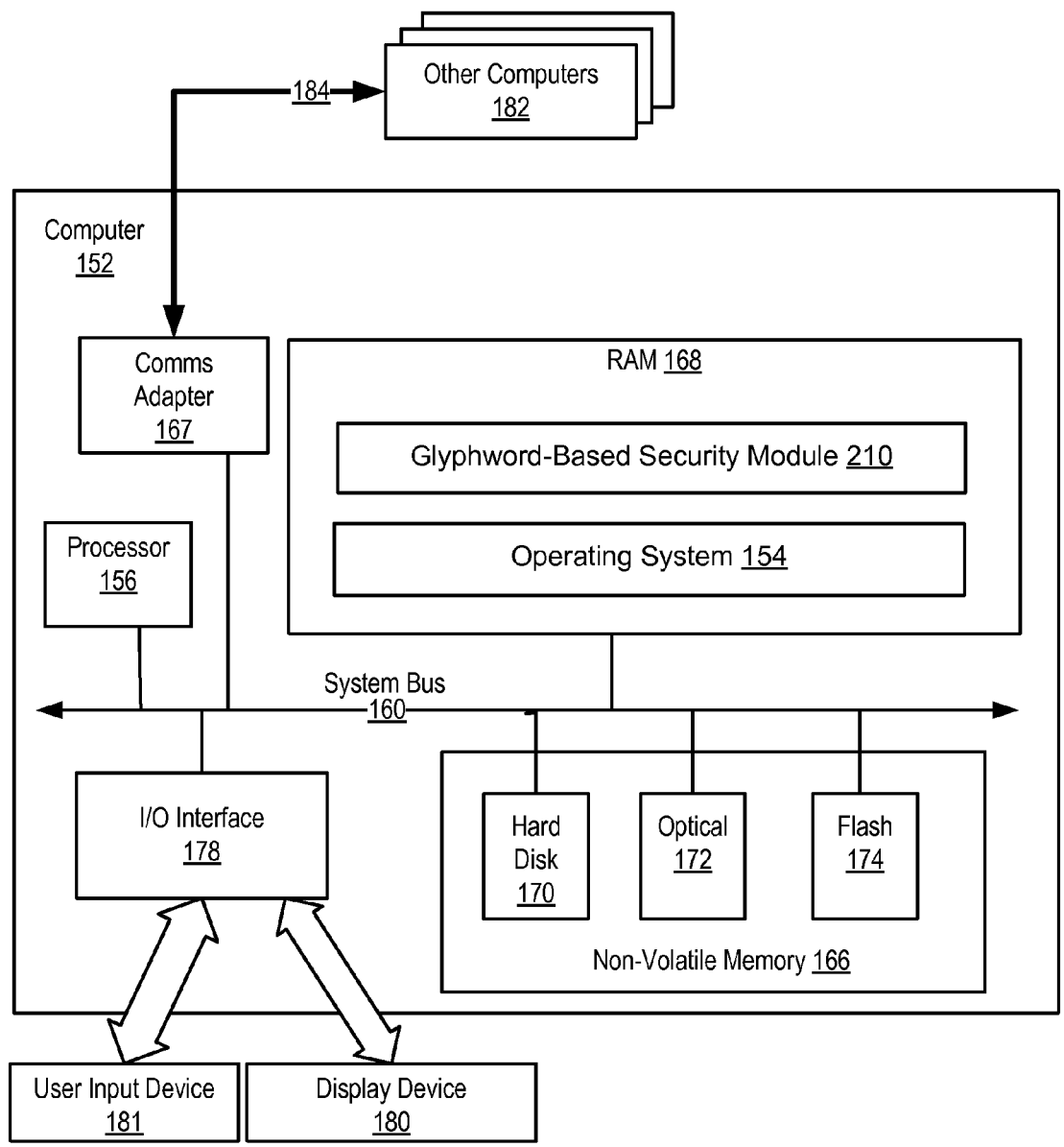
FIG. 2 sets forth a block diagram of automated computing machinery comprising an exemplary computer useful in glyphword-based security according to embodiments of the present invention.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful with embodiments of the present invention include modems for wired dial-up communications, Ethernet (IEEE 802.3) adapters for wired network communications, and 802.11b adapters for wireless network communications.

Figure 3:
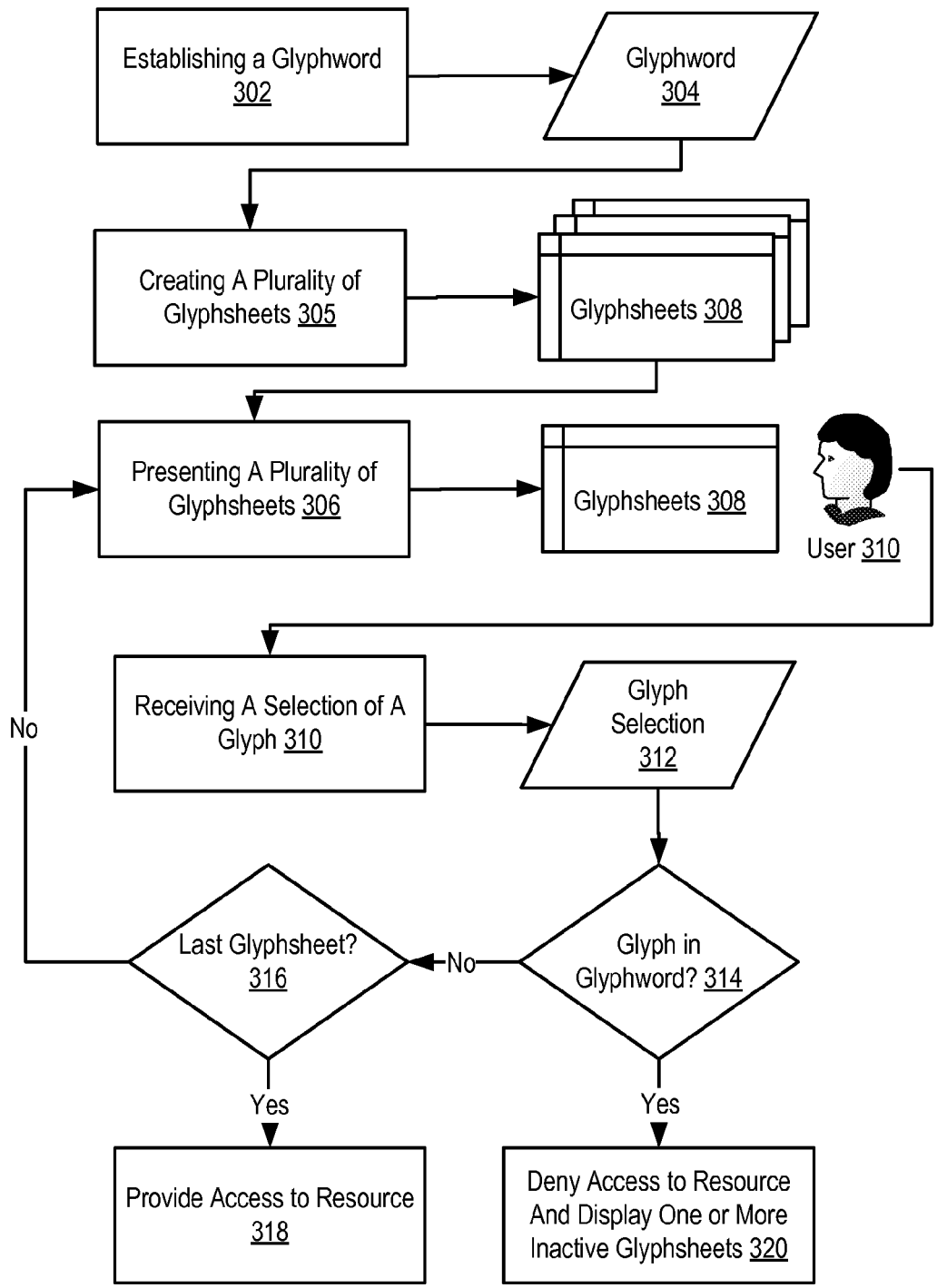
FIG. 3 sets forth a flow chart illustrating an exemplary method for glyphword-based security according to the present invention.

For further explanation, FIG. 3 sets forth a flow chart illustrating an exemplary method for glyphword-based security according to the present invention. The method of FIG. 3 includes establishing (302) a glyphword (304) comprising a plurality of glyphs. As mentioned above, a glyph is a symbolic figure or character that stands for an element in a glyphword. A glyphword is a collection of glyphs defining a password governing access to one or more resources. Such a glyphword may govern access to one or more resources for a user, such as a person or process, or may govern access to resources themselves for any class of users having possession of the glyphword.

Figure 4:
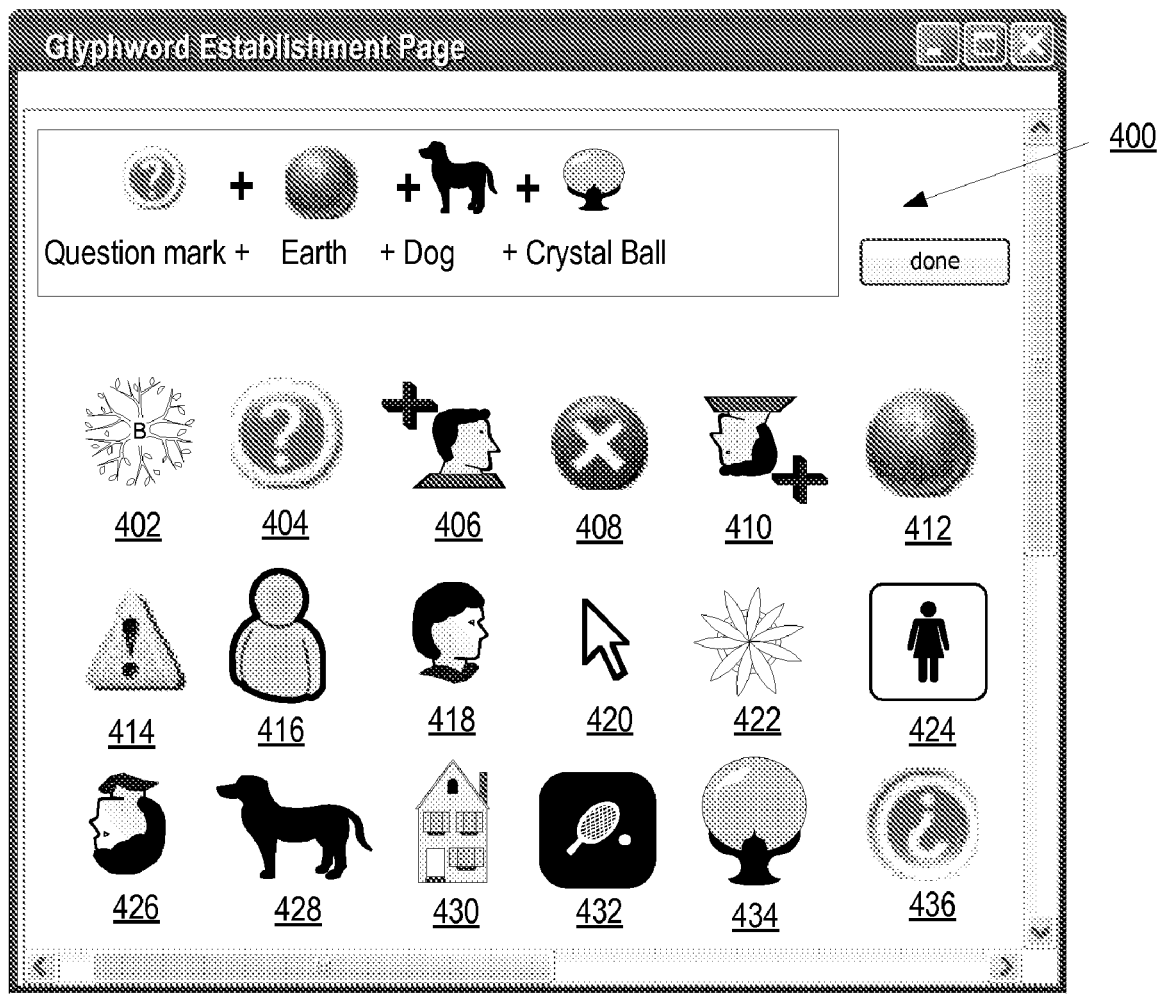
FIG. 4 sets forth a block diagram illustrating an exemplary glyphword establishment page useful in establishing a glyphword in accordance with glyphword-based security according to the present invention.

Establishing (302) a glyphword (304) comprising a plurality of glyphs may be carried out by presenting a user with a selection of glyphs and receiving from the user a plurality of selections of glyphs comprising the glyphword. Presenting a user with a selection of glyphs and receiving from the user a plurality of selections of glyphs comprising the glyphword may be carried out through the user of a graphical user interface ('GUI'). For further explanation, therefore, FIG. 4 sets forth a block diagram illustrating an exemplary glyphword establishment page (400) useful in establishing a glyphword in accordance with glyphword-based security according to the present invention. The glyphword establishment page (400) of FIG. 4 is configured for establishing a glyphword by presenting a plurality of glyphs and receiving from a user a plurality of selections of glyphs comprising the glyphword. The exemplary glyphword establishment page (400) of FIG. 4 includes glyphs for selection by a user for inclusion in the glyphword. The selection of glyphs include a snowflake (402), a question mark (404), a user with a plus (406), an X (408), an upside down user with a plus (410), an earth (412), an exclamation point (414), a blob man (416), a user (418), a pointer (420), a flower (422), a woman (424), an upside down user (426), a dog (428), a house (430), a tennis racket (432), a crystal ball (434), and an upside down question mark (436). In the example of FIG. 4, a user has established a glyphword of "question mark+earth+dog+crystal ball" by selecting the glyph for the question mark (404), the glyph for earth (412), the glyph for dog (428), and the glyph for crystal ball (434).

In the example of FIG. 3, similar symbols having different orientations are considered distinct glyphs. The use of partial, colored, rotated, reversed, or otherwise modified symbols as distinct glyphs makes many of the glyphs look similar but maintains those glyphs as distinct. This increases security in two ways. First, more glyphs are provided and second, the distinctions between the glyphs are more subtle.

The glyphs presented in the exemplary glyph establishment page of FIG. 4 are for explanation and not for limitation. In fact, any number of glyphs may be included in a glyphword according to the present invention as will occur to those of skill in the art. In fact, in some embodiments, one or more of glyphs of the glyphword may be proprietary glyphs such as trademarks or other proprietary symbols or characters. Owners of the glyphs may pay to have their proprietary glyphs included in glyphwords for glyph-word based security according to the present invention.

Furthermore, the number of glyphs presented in the exemplary glyph establishment page of FIG. 4 are for also explanation and not for limitation. In fact, a glyphword may be comprised of any number of glyphs. As will occur to those of skill in the art as the number of glyphs in the glyphword increases, so does the security of the glyphword-based security according to the present invention. Such increases in security of course are often weighed against practical considerations such as increased burden on users as the number of glyphs in the glyphword increases.

Figure 5:
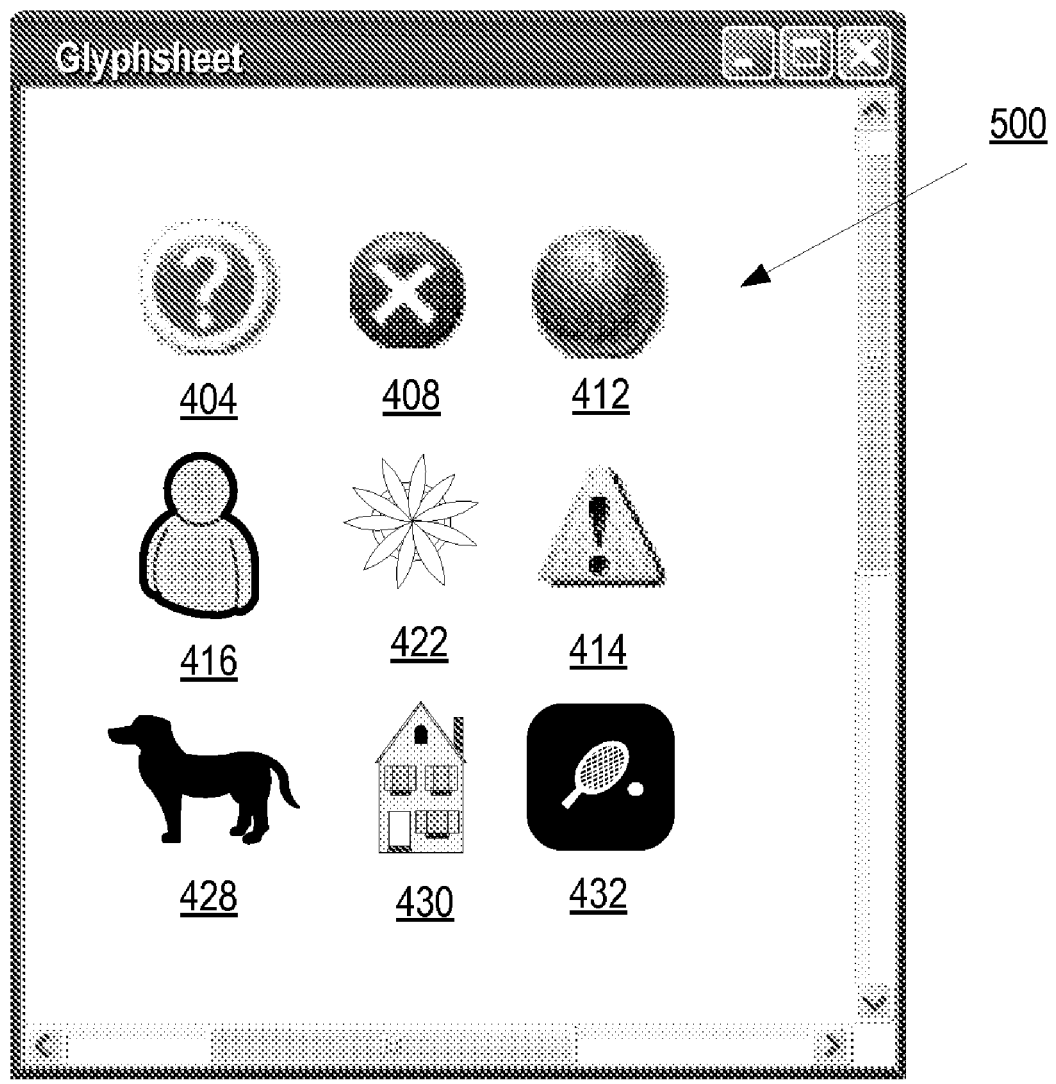
FIG. 5 sets forth a block diagram of an exemplary glyphsheet useful in glyphword-based security according to the present invention.

Again with reference to FIG. 3: After establishing (302) a glyphword (304), the method of FIG. 3 includes creating (305) a plurality of glyphsheets (308). Each glyphsheet in the example of FIG. 3 includes one or more glyphs included in the established glyphword (304) and one or more glyphs not included in the established glyphword. As discussed above, a glyphsheet is a collection of glyphs, often implemented as a matrix of glyphs. For further explanation, therefore, FIG. 5 sets forth a block diagram of an exemplary glyphsheet (500) useful in glyphword-based security according to the present invention. The exemplary glyphsheet (500) of FIG. 5 is implemented as a three by three matrix of glyphs. The glyphsheet (500) includes three of the four glyphs from exemplary glyphword established in the example of FIG. 4, "question mark+earth+dog+crystal ball." The three of the four glyphs from exemplary glyphword include a glyph for the question mark (404), a glyph for earth (412), and the glyph for dog (428). The exemplary glyphsheet (500) of FIG. 5 also includes glyphs not included in the glyphword. The glyphs not included in the glyphword include an X (408), a blob man (416), a snowflake (422), an exclamation point (414), a house (430), and a tennis racket (432).

The exemplary glyphs presented in the exemplary glyphsheet (500) of FIG. 5 are for explanation and not for limitation. In fact, any number of glyphs may be included in a glyphsheet according to the present invention as will occur to those of skill in the art. In fact, in some embodiments, one or more of glyphs of the glyphsheet may be proprietary glyphs such as trademarks or other proprietary symbols or characters. Owners of the glyphs may pay to have their proprietary glyphs included in glyphsheets for glyph-word based security according to the present invention.

Again with reference to FIG. 3: Creating (305) a plurality of glyphsheets (308) according to the method of FIG. 3 includes determining the number of glyphsheets to present to the user, selecting a glyph configuration for each glyphsheet; selecting one or more glyphs not included in the glyphword from a glyph database; and including the selected glyphs in the glyphsheet according to the selected glyph configuration. A glyphsheet designed identifying the number of glyphs in the glyphsheet and the ratio of glyphs in the glyphword to glyphs not in the glyphword. The glyphs for inclusion in the glyphseet may be selected from a glyphs database.

As will occur to those of skill in the art, number of glyphsheets presented to a user and the number of glyphs contained in each glyphsheet may vary according to a number factors. As the number of glyphsheets presented to a user increases, the likelihood of security failure decreases. Furthermore, as the number of glyphs in each glyphsheet increase, the likelihood of would-be intruders identifying glyphs in a glyphword my monitoring a user also decreases. For this reason, the number of glyphsheets and the configuration defining the number of glyphs in each glyphsheet may be implemented as configurable parameters appropriate for the level of security desired.

Consider for example, with a glyphword containing 8 glyphs, and a glyphsheet implemented as a 3×3 matrix of glyphs having 7 of 9 glyphs not contained in the glyphword, the probability of a would-be intruder guessing the glyphword when presented with 8 such glyphsheets is calculated as: $(1-7/9)^8=0.000005$ or 1 in 168,151. Furthermore, with a glyphword of 16 glyphs and a glyphsheet implemented as a 9×9 matrix of glyphs with 50 of 81 glyphs not in the glyphword, the probability of a would-be intruder guessing the glyphword when presented with 16 such glyphsheets is calculated as: $(1-50/81)^{16}=0.0000002$ or 1 in 4,720,339. Even further, with a glyphword of 12 glyphs and a glyphsheet including a 4×4 matrix of glyphs, with 12 of 16 of the glyphs not in the glyphword the probability of a would-be intruder guessing the glyphword when presented with 12 such glyphsheets is calculated as: $1-12/15)^{12}=0.00000000596$ or 1 in 16,777,216.

For further security, some glyphsheets that are inactive may be presented with active glyphsheets. An active glyphsheet includes glyphsheets having glyphs in the glyphword and therefore may act to deny access to the resource. An inactive glyphsheet contains no glyphs in the glyphword and therefore cannot act to deny access to the resource, but may act to reduce the possibility of would-be intruders identifying the glyphword by monitoring a user. The inactive glyphsheets without peril (the glyphsheets that do not contain glyphs of the glyphword) do not count towards authentication. For example, a user may be presented with 12 glyphsheets, 8 of which are active and four of which are active. The inactive glyphsheets are presented with the intention of throwing off frequency analysis in case of would-be intruders monitoring the activities of a user and to increase the chances against someone determining the length of the glyphword chosen. An authorized user will select glyphs not in the glyphword when presented both inactive and active glyphsheets until the user is provided access to the resource.

The timing of glyphsheet presentation may also be configurable and in some embodiments a user may be presented with more glyphsheets than selections received in response to those glyphsheets. That is, in such embodiments, different glyphsheets are periodically presented and when a user has selected a predetermined number of glyphs not in the glyphword in response to predetermined number of glyphsheets regardless of how many glyphsheets are actually presented, access to the resource is provided. Automatically presenting glyphsheets until access is determined may additionally function as a screen saver.

The number of glyphsheets presented to a user and the configuration of such glyphsheets will therefore vary according to factors such as the degree of security desired, the burden of creating and presenting glyphsheets, and others as will occur to those of skill in the art and such factors governing the number of glyphsheets presented may be configurable by a system administrator.

Each created glyphsheet is not required to have the same configuration. For example, a series of glyphsheets may contain different configurations, each glyphsheet having different numbers of glyphs and different ratios of glyphs in the glyphword and glyphs not in the glyphword. Such glyphsheet creation may be defined by rules for statistically reducing the possibility intrusion. In such cases authorized users may be presented with persistently glyphsheets containing fewer glyphs over the long term such as over several future authentication attempts. When a user is denied access due to selecting a glyph in the glyphword, the user may then be presented with glyphsheets with more glyphs. This way of glyphsheet creation allows for long term protection against recording systems and short term protection against illegal access attempts by adaptively modifying the glyph frequency distribution to suit the situation.

After creating (305) a plurality of glyphsheets (308), the method of FIG. 3 continues for each of the created glyphsheets (308), by presenting (306) to a user (310) the glyphsheet (308) and receiving (310) from the user (310) at least one selection (312) of a glyph on the plurality of glyphsheets (308). Receiving (310) from the user (310) at least one selection (312) of a glyph on the plurality of glyphsheets (308) may be carried out through use of a GUI selection on, for example, a touch sensitive GUI screen, through, for example, a selection using pointer and mouse, or any other way of receiving a selection of a glyph as will occur to those of skill in the art.

The method of FIG. 3 also includes determining (314) if the selection of the glyph received by the user is in the glyphword (304) and denying (320) access to a resource if any of the glyphs selected by the user are included in the plurality of glyphs of the glyphword (304). Upon receiving a selection of a glyph included in the glyphword, the user is denied access to resources governed by that glyphword. As an aid to security, in response to receiving a selection that is included in the glyphword some embodiments of the present invention include presenting one or more inactive glyphsheets in response to receiving from a user a selection of any glyph of the glyphword. By presenting inactive glyphsheets an unauthorized or unauthenticated user is not immediately made aware of which glyph received in response to which glyphsheet was the cause of the denial of access.

The method of FIG. 3 includes determining (316) whether the glyphsheet is the last glyphsheet, if the glyph (312) selected by the user (310) is not included in the glyphs of the glyphword (304). That is, the method of FIG. 3 includes determining whether additional glyphsheets are to be presented to the user as further security challenges in response to receiving a selection of a glyph that is not in the glyphword. Determining (316) whether the glyphsheet is the last glyphsheet may be carried out by determining whether another created glyphsheet exists that has not yet been presented to the user. If such a glyphsheet exists, the next glyphsheet is presented to the user. As mentioned above, the number of glyphsheets presented to a user may vary according to factors such as the degree of security desired, the burden of creating and presenting glyphsheets, and others as will occur to those of skill in the art.

The method of FIG. 3 also includes providing (318) access to a resource if the glyphsheet is the last glyphsheet. If the glyphsheet is the last glyphsheet and therefore there are no additional security challenges to present to the user, then access to one or more resources protected by glyphword-based security according to the present invention is granted.

Exemplary embodiments of the present invention are described largely in the context of a fully functional computer system for glyphword-based security. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for glyphword-based security, the method comprising:
   establishing, by a glyphword-based security module comprising a module of automated computing machinery, a glyphword comprising a plurality of glyphs; and
   creating, by the glyphword-based security module, a plurality of glyphsheets wherein each glyphsheet includes one or more glyphs included in the established glyphword and one or more glyphs not included in the established glyphword;
   and for each glyphsheet:
   presenting by the glyphword-based security module to a user the glyphsheet;
   receiving by the glyphword-based security module from the user at least one selection of a glyph included in the glyphsheet;
   determining, by the glyphword-based security module, whether the glyphsheet is the last glyphsheet if the glyph selected by the user is not included in the glyphs of the glyphword;
   providing, by the glyphword-based security module, access to a resource if the glyphsheet is the last glyphsheet; and
   denying access to a resource if any of the glyphs selected by the user are included in the plurality of glyphs of the glyphword.

2. The method of claim 1 further comprising presenting one or more inactive glyphsheets in response to receiving from a user a selection of any glyph included in the glyphword.

3. The method of claim 1 wherein establishing a glyphword including a plurality of glyphs further comprises receiving from a user a plurality of selections of glyphs.

4. The method of claim 1 wherein creating a plurality of glyphsheets wherein each glyphsheet includes one or more glyphs included in the established glyphword and one or more glyphs not included in the established glyphword further comprises:
   selecting a glyph configuration for each glyphsheet; and
   selecting one or more glyphs not included in the glyphword from a glyph database; and
   including the selected glyphs in the glyphsheet according to the selected glyph configuration.

5. The method of claim 4 further comprising determining the number of glyphsheets to present to the user.

6. The method of claim 1 wherein one or more of glyphs of the glyphword comprises proprietary glyphs.

7. The method of claim 1 wherein one or more of glyphs of the glyphsheets comprises proprietary glyphs.

8. A system for glyphword-based security, the system comprising:
   a computer processor;

a computer memory operatively coupled to the computer processor, the computer memory having disposed within it computer program instructions capable of:

establishing a glyphword comprising a plurality of glyphs; and creating a plurality of glyphsheets wherein each glyphsheet includes one or more glyphs included in the established glyphword and one or more glyphs not included in the established glyphword;

and for each glyphsheet:

presenting to a user the glyphsheet;

receiving from the user at least one selection of a glyph included in the glyphsheet;

determining whether the glyphsheet is the last glyphsheet if the glyph selected by the user is not included in the glyphs of the glyphword;

providing access to a resource if the glyphsheet is the last glyphsheet; and denying access to a resource if any of the glyphs selected by the user are included in the plurality of glyphs of the glyphword.

9. The system of claim 8 wherein the computer memory also has disposed within it computer program instructions capable of presenting one or more inactive glyphsheets in response to receiving from a user a selection of any glyph included in the glyphword.

10. The system of claim 8 wherein program instructions capable of establishing a glyphword including a plurality of glyphs further comprise program instructions capable of receiving from a user a plurality of selections of glyphs.

11. The system of claim 8 wherein computer program instructions capable of creating a plurality of glyphsheets wherein each glyphsheet includes one or more glyphs included in the established glyphword and one or more glyphs not included in the established glyphword further comprise computer program instructions capable of:

selecting a glyph configuration for each glyphsheet; and selecting one or more glyphs not included in the glyphword from a glyph database; and including the selected glyphs in the glyphsheet according to the selected glyph configuration.

12. The system of claim 11 wherein the computer memory also has disposed within it computer program instructions capable of determining the number of glyphsheets to present to the user.

13. A computer program product for glyphword-based security, the computer program product embodied on a computer-readable recordable medium, the computer program product comprising:

computer program instructions for establishing a glyphword comprising a plurality of glyphs; and computer program instructions for creating a plurality of glyphsheets wherein each glyphsheet includes one or more glyphs included in the established glyphword and one or more glyphs not included in the established glyphword;

and for each glyphsheet:

computer program instructions for presenting to a user the glyphsheet;

computer program instructions for receiving from the user at least one selection of a glyph included in the glyphsheet;

computer program instructions for determining whether the glyphsheet is the last glyphsheet if the glyph selected by the user is not included in the glyphs of the glyphword;

computer program instructions for providing access to a resource if the glyphsheet is the last glyphsheet; and computer program instructions for denying access to a resource if any of the glyphs selected by the user are included in the plurality of glyphs of the glyphword.

14. The computer program product of claim 13 further comprising computer program instructions for presenting one or more inactive glyphsheets in response to receiving from a user a selection of any glyph included in the glyphword.

15. The computer program product of claim 13 wherein computer program instructions for establishing a glyphword including a plurality of glyphs further comprise computer program instructions for receiving from a user a plurality of selections of glyphs.

16. The computer program product of claim 13 wherein computer program instructions for creating a plurality of glyphsheets wherein each glyphsheet includes one or more glyphs included in the established glyphword and one or more glyphs not included in the established glyphword further comprise:

computer program instructions for selecting a glyph configuration for each glyphsheet; and computer program instructions for selecting one or more glyphs not included in the glyphword from a glyph database; and computer program instructions for including the selected glyphs in the glyphsheet according to the selected glyph configuration.

17. The computer program product of claim 16 further comprising computer program instructions for determining the number of glyphsheets to present to the user.

\* \* \* \* \*